July 26, 1966     B. E. WILLIAMS     3,262,382
ELECTRIC FRANKFURTER COOKER AND GRILL
Filed Feb. 11, 1965
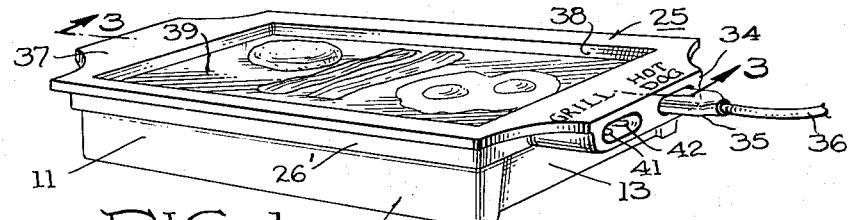
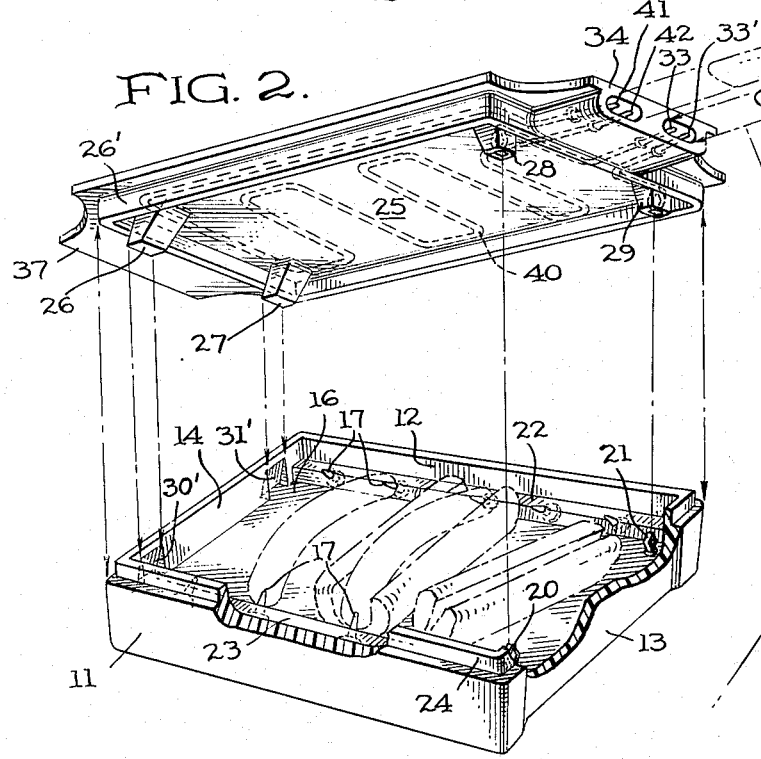
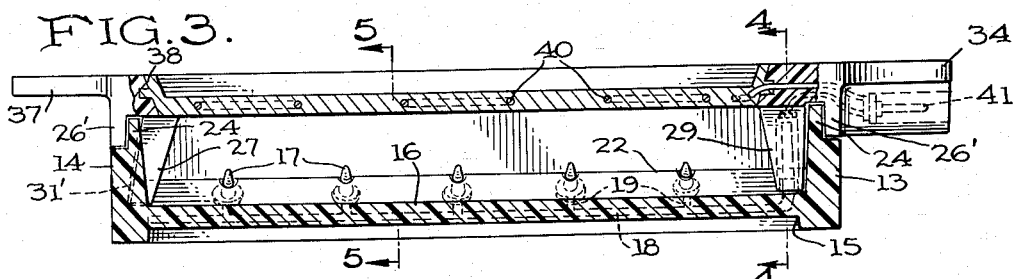
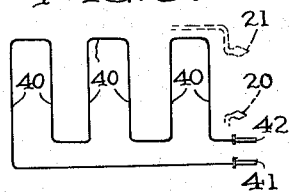
INVENTOR
BEVERLY E. WILLIAMS.
BY Cameron, Kerkam & Sutton
ATTORNEYS 3,262,382
ELECTRIC FRANKFURTER COOKER AND GRILL
Beverly E. Williams, La Grange Park, Ill., assignor to Hodges Research and Development Company, New York, N.Y., a corporation of California
Filed Feb. 11, 1965, Ser. No. 431,821
5 Claims. (Cl. 99—339)

This invention relates to an electric frankfurter cooker and grill combination, the frankfurter cooker being generally of the type described in my United States Patent No. 2,951,434, granted September 6, 1960.

Heretofore, various frankfurter cookers have been proposed of the type generally described in my patent referred to above and these electric cookers have been successful both commercially and from the point of view of the user. However, these electric cookers can be used only for cooking frankfurters and it is not possible to heat the bun or roll for use with the frankfurter. More general utility of the cooker would be available if an electric grill was incorporated therewith, this grill being useful not only for heating the bun or roll to be used with the frankfurter but also for general cooking for which a grill can be used. The present invention provides such a combination frankfurter cooker and grill.

It is therefore an object of the present invention to provide a novel electric cooking device which is a combination frankfurter cooker and electric grill in which the frankfurter cooker and electric grill may be selectively used and the grill used either for general cooking purposes of for heating the rolls or buns to be used with the frankfurters.

Another object is to provide a frankfurter cooker in which the buns or rolls can be steam-heated with or in contact with the frankfurters being heated.

Another object of the present invention is to provide such a novel electric cooking device in which the frankfurter cooker is mounted in a hollow base and the grill is formed as the top of the base, the electric circuitry to the frankfurter cooker being completed only when the top or grill is mounted in positon on the base.

Another object of the present invention is to provide such a novel combination frankfurter cooker and grill which may be readily cast from known heat resistant material and in which the grill may be cast separately from the base and can, if desired, be used as a separate cooking device from the frankfurter cooker.

Another object of the present invention is to provide such a novel cooker which is relatively cheap and easy to manufacture and which is easy to clean, service and maintain.

Another and still further object of the present invention is to provide such a novel combined electric cooker which will meet the requirements of various safety codes and may be used easily by the inexperienced and by children without risk.

Other and further objects of the present inventon will appear from the following description of an illustrative embodiment thereof.

The novel electric cooking device of the present invention is capable of various mechanical embodiments one of which is shown in the accompanying drawing and is described hereinafter to illustrate the invention.

This illustrative embodiment of the invention should in no way be construed as defining or limiting the same and reference should be had to the appended claims to determine the scope of this invention.

In the accompanying drawings, in which like reference characters indicate like parts:

FIG. 1 is a perspective view of a preferred embodiment of the combined electric cooking device of the present invention with the top or grill thereof in place on the base which encloses the frankfurter cooker;

FIG. 2 is an exploded view of the embodiment of FIG. 1 showing the grill or top separated from the base and showing frankfurters in position to be cooked and rolls to be heated in the base;

FIG. 3 is a cross-sectional view on the line 3—3 of FIG. 1;

FIG. 4 is an enlarged detail in section on the line 4—4 of FIG. 3;

FIG. 5 is an enlarged detail in section on the line 5—5 of FIG. 3;

FIG. 6 is a view from above of the circuitry for the electric resistance heaters for the grill as seen in FIG. 2; and FIG. 6A is a view from above of the circuitry for the electric contacts on which the frankfurters are impaled for cooking.

Referring now to the drawings and the several figures thereof, a unitary cast hollow base 10 is formed of any suitable material such as a heat resistant plastic and has side walls 11 and 12 and end walls 13 and 14. Preferably, a downwardly extending rim 15 is provided beneath bottom 16 of base 10 to provide a support on which the electric cooker may rest.

Side walls 11 and 12 and end walls 13 and 14 together with bottom 16 enclose a generally rectangular open cooking compartment in which a plurality of electric contacts 17 are disposed. As seen in FIG. 5, a bus bar 18 is integrally cast in the bottom of base 10 adjacent the bottom of wall 12 and is provided with leads 19 leading to contacts 17. A similar bus bar and contacts 17 are integrally cast in the bottom of base 10 adjacent the bottom of wall 11. Contacts 17 are arranged in oppositely disposed pairs to support a frankfurter when the ends of the frankfurter are impaled thereon. Bus bars 18 lead to contacts 20 and 21.

As seen in FIG. 2, the frankfurter is arched between opposed contacts 17 and impaled thereon so that when contacts 20 and 21 are connected to a suitable source of electricity, the electricity will pass through the frankfurter between the opposed contacts 17 and will cook the frankfurter.

Angle members 22 and 23 of plastic or other suitable electrically insulating material are suitably apertured in the apices thereof to permit the pointed tips of contacts 17 to extend therethrough to prevent the frankfurter from being too deeply impaled thereon to minimize charring at the ends of the frankfurter. Angle members 22 may be removed for easy cleaning of the device.

A continuous upwardly extending rim 24 is provided at the tops of sides 11 and 12 and ends 13 and 14. Top or grill 25 is provided with a continuous downwardly depending rim 26' which fits down and over rim 24 when top 25 is mounted on base 10, as seen in FIGS. 1 and 3, to form a barrier preventing the insertion of an implement into base 10 when the device is assembled for cooking frankfurters. The barrier thus provided is a safety feature to protect the user of the device from electrical shock.

Top or grill 25 is provided with downwardly and angularly extending legs 26, 27, 28 and 29 (FIGS. 2 and 3) to support top or grill 25 when it is used as a cooking device independent of base 10 or when used as a server. End wall 14 of base 10 is provided with recesses 30' and 31' to receive angularly disposed legs 26 and 27 when top 25 is in position on base 10. Legs 28 and 29 frictionally engage front wall 13 of base 10 when top 25 is in position thereon. The engagement of legs 26, 27, 28 and 29 with the respective walls of base 10 when top 25 is in position thereon lock top 25 to base 10 and prevents accidental separation of top 25 and base 10 during cooking of the frankfurters. Recesses 30' and 31' may be formed as a single continuous recess for easier mounting of top 25 on base 10.

As seen in FIG. 4, contact 21 forms the knife element of a knife-type electric switch having spring contact elements 30 mounted in aperture 31 of leg 29. A similar switch construction is located in leg 28 for contact 20 of bus bar 18. These switches are so arranged that contacts 20 and 21 will be engaged by springs 30 only when top 25 is in fully closed position on base 10. Electric leads 32 lead from springs 30 to suitable prong-type electric contacts 33 and 33' which are disposed in handle portion 34 of top 25 for engagement by a conventional plug 35 on electric cord 36. When plug 35 of cord 36 is in position engaging prongs 33 and when top 25 is in place on bottom 10 so that contacts 20 and 21 are engaged by their respective spring contacts 30, electric current passes to bus bars 18 and to contacts 17 for cooking frankfurters impaled upon contacts 17.

Top 25 includes a handle 37 oppositely disposed to handle 34 and top 25 is rectangularly cut away at 38 to receive any suitable grill plate 39 which may be made of cast aluminum or any other suitable heat transfer material. Cast integrally in plate 39 is a conventional electric resistance-type heating element 40 which is connected to electric contacts 41 and 42. Contacts 41 and 42 are mounted in handle 34 to receive plug 35 of electric cord 36. When plug 35 is in position engaging contacts 41 and 42, electric current passes to resistance element 40 and plate 39 is heated so that the surface thereof may be employed as a grill either to warm the buns or rolls for the frankfurters or for general cooking purposes.

It should now be apparent that the present invention in every way satisfies the several objects described above.

Changes in or modifications to the above described illustrative embodiment of this invention may now be suggested to those skilled in the art without departing from the present inventive concept. Reference should therefore be had to the appended claims to determine the scope of this invention.

What is claimed is:

1. An electric cooking device comprising a hollow base, oppositely disposed bus bars in said base, oppositely disposed contacts on said bus bars, opposed pairs of said contacts being adapted to receive a frankfurter, an electric contact for each of said bus bars mounted in said base, a top for said base, electric contacts in said top for engagement with said electric contacts of said bus bars when said top is in position on said base, a heat conducting plate mounted in said top, electric resistance heating elements mounted in said plate, electric contacts in said top connected to said electric contacts for said bus bars and electric contacts in said top connected to said electric resistance heating elements.

2. An electric cooking device as described in claim 1 including an upstanding rim about the upper portion of said base and a downwardly extending rim on said top receiving said upstanding rim on said base.

3. An electric cooking device as described in claim 1 including legs depending from said top, said electric contacts in said top for engagement with said electric contacts of said bus bars being mounted in certain of said legs.

4. An electric cooking device as described in claim 1 including legs depending from said top, slots within said base receiving certain of said legs and said electric contacts in said top for engagement with said electric contacts for said bus bars being mounted in others of said legs.

5. An electric cooking device comprising a hollow base, oppositely disposed bus bars in said base, oppositely disposed contacts on said bus bars, opposed pairs of said contacts being adapted to receive a frankfurter impaled thereon, an electric contact for each of said bus bars mounted in said base, an upstanding rim about the upper portion of said base, a top for said base, a downwardly extending rim on said top receiving said upstanding rim on said base, legs depending from said top, slots within said base receiving certain of said legs, electric contacts in others of said legs for engagement with said electric contacts of said bus bars when said top is in position on said base, a heat conducting plate mounted in said top, electric resistance heating elements mounted in said plate, electric contacts in said top connected to said electric contacts for said bus bars and electric contacts in said top connected to said electric resistance heating elements.

References Cited by the Examiner
UNITED STATES PATENTS

| | | | |
|---|---|---|---|
| 1,263,359 | 4/1918 | Armstrong | 99—339 |
| 2,052,919 | 9/1936 | Brogdon et al. | 99—358 X |
| 2,230,268 | 2/1941 | Russell et al. | 219—454 |
| 2,234,596 | 3/1941 | Heilman | 219—454 X |
| 2,291,359 | 7/1942 | Uhlrig et al. | 219—393 |
| 2,924,167 | 2/1960 | Rhodes | 99—337 |
| 2,951,433 | 9/1960 | Steuber et al. | 99—337 |
| 2,951,434 | 9/1960 | Williams | 99—337 |
| 2,980,010 | 4/1961 | Williams | 99—337 |

WALTER A. SCHEEL, *Primary Examiner.*